United States Patent [19]

Somerton

[11] Patent Number: 5,406,656
[45] Date of Patent: Apr. 18, 1995

[54] RV SINK COVER/CUTTING BOARD

[75] Inventor: Michael G. Somerton, Goodlettsville, Tenn.

[73] Assignee: CAMCO Manufacturing, Inc., Greensboro, N.C.

[21] Appl. No.: 280,373

[22] Filed: Jul. 26, 1994

Related U.S. Application Data

[63] Continuation of Ser. No. 66,851, May 25, 1993, abandoned.

[51] Int. Cl.$^6$ ............................................. A47J 47/20
[52] U.S. Cl. ......................................... 4/656; 4/631
[58] Field of Search ................ 4/579.1, 580, 631, 637, 4/638, 655, 656, 657

[56] References Cited

U.S. PATENT DOCUMENTS

| 2,237,076 | 4/1941 | Kenney et al. | 4/579.1 |
| 2,238,699 | 4/1941 | Levine | 4/353 |
| 3,451,069 | 6/1969 | Cronin | 4/580 |

FOREIGN PATENT DOCUMENTS

| 3-202517 | 9/1991 | Japan. | |
| 0634540 | 3/1950 | United Kingdom | 4/656 |

Primary Examiner—Charles E. Phillips

[57] ABSTRACT

A sanitary attractive sink cover/cutting board for recreational vehicles having adjustable feet for universal fit and available in decorator colors, adding work space, cutting surface, sink concealment, and complementing decor of the RV.

8 Claims, 1 Drawing Sheet

RV SINK COVER/CUTTING BOARD

This is a continuation of application Ser. No. 08/066,851 filed 25 May 1993, now abandoned.

BACKGROUND OF THE INVENTION

1. Field of the Invention

This invention relates to utilitarian sink covers and cutting boards for kitchen use, specifically to those designed for use in recreational vehicles.

2. Description of Prior Art

Numerous types of sink covers have been devised to conceal unsightly kitchen sinks when not in use, and many have also incorporated other utilitarian functions such as dish racks or cutting boards.

Cutting boards for kitchen use are made of wood, glass, plastic and stone, and have been adapted to slide into kitchen cabinets, to fit on dishwasher lids or stovetops, to mount on the kitchen counter top, or to double as a sink cover.

Adaptations of traditional cutting boards have developed, including boards slotted to hold knives, boards with flush-mounted strainers to catch portions as they are cut, and other utilitarian and ornamental improvements.

There are a number of sink cover/cutting boards available which are designed for recreational vehicle kitchens, where space and working surface is especially at a premium.

Currently available models generally fall into two categories: those that fit over the sink and those that fit in the top of the sink. Most are made of wood or plastic. Some have handles attached, some have drain slots to be used as hand-holds, and others are solid-surface.

In appearance, the currently available sink cover/cutting boards are of treated wood, almond color plastic or transparent plastic with decorative designs. None are currently available in designer colors to complement and enhance the decor of the recreational vehicle interior.

Those sink cover/cutting board combinations for recreational vehicles either fit snugly inside the sink or have fixed-position feet to hold them in place while in use.

Thus, these boards are designed to fit only the one most common size of the several different sink sizes found in recreational vehicles, 12"×14". Many RV's are equipped with sinks at least two inches smaller than that. One manufacturer offers to custom-build the sink cover/cutting board by special order for sizes other than 12"×14".

OBJECTS AND ADVANTAGES

Accordingly, besides the objects and advantages of the recreational vehicle sink cover/cutting boards described above, several objects and advantages of the present invention are:

(a) to provide a sink cover/cutting board designed specifically for sinks installed in recreational vehicles;

(b) to provide a sink cover/cutting board available as a standard item in designer colors to complement and enhance the interior decor of the recreational vehicle;

(c) to provide a sink cover/cutting board as a standard item having adjustable feet which allow for a precise fit in most sinks installed in recreational vehicles;

(d) to provide a sink cover/cutting board having non-skid feet to hold the board in place while in use on the counter or table top as a cutting board.

DRAWING FIGURES

Figure 1:
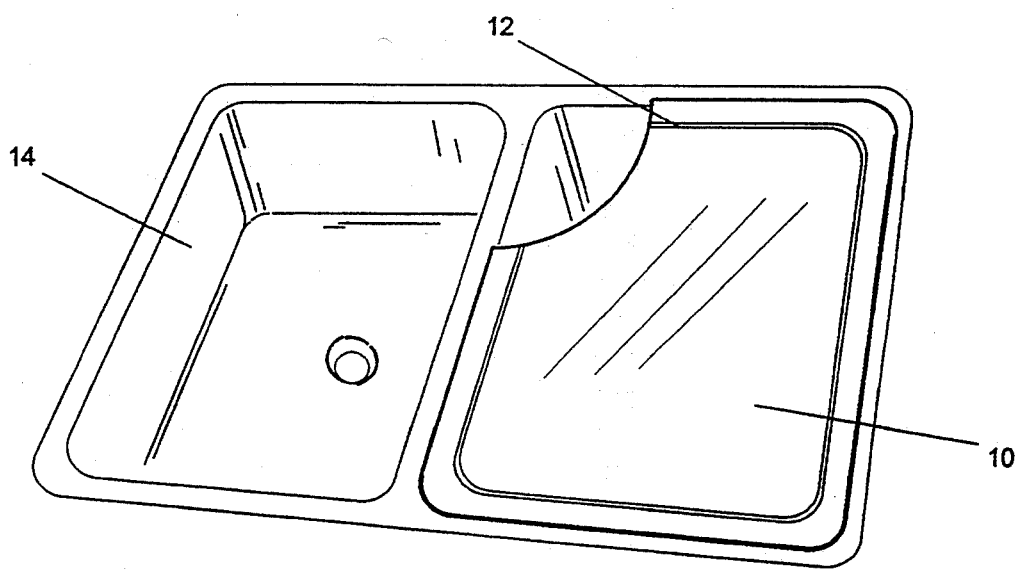
FIG. 1 shows a perspective top view of a sink cover/cutting board installed on RV sink.

| REFERENCE NUMERALS IN DRAWINGS | |
|---|---|
| 10 | sink cover/cutting board |
| 12 | juice groove |
| 14 | RV sink |
| 16 | foot |
| 18 | slot |
| 20 | screw |
| 22 | nut |

DESCRIPTION

Figure 2:
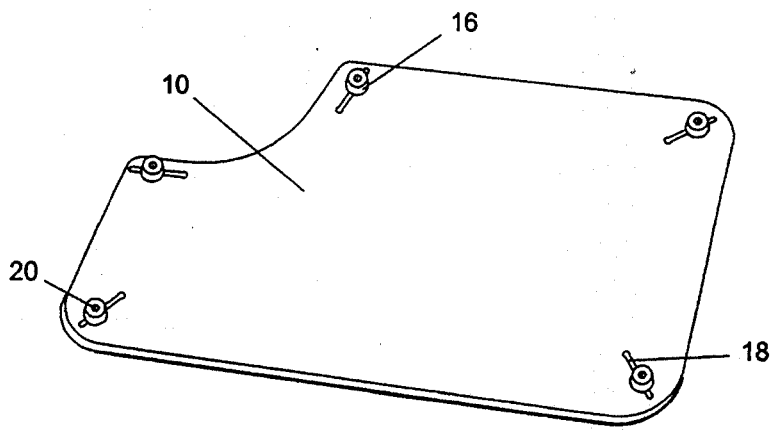
FIG. 2 shows the underside of a sink cover/cutting board.
Figure 3:
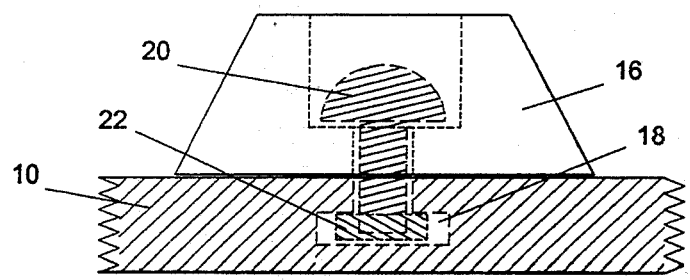
FIG. 3 shows details of adjustable foot in cross-section.

A preferred embodiment of the RV sink cover/cutting board of the present invention is illustrated in FIG. 1 (top view) and FIG. 2 (bottom view).

The sink cover/cutting board 10 in this embodiment is made of polyethylene and fits precisely flush with the top surface of RV sink 14.

A juice groove 12 is machined into the top surface of the sink cover/cutting board 10 to allow liquids to drain into sink 14 while in use.

Rubber or other high-friction material foot 16 adjusts to position in slot 18 by loosening and tightening screw 20. One corner of sink cover/cutting board 10 is cut out to define an arcuate opening, which serves as a hand-hold and as a water stream passage between the sink side wall and sink cover/cutting board 10. As seen in FIG. 1, juice groove 12 communicates with and empties at both ends into the arcuate opening to allow liquids to drain into the sink below.

OPERATION

The manner of using the sink cover/cutting board 10 is to first loosen screws 20, adjust all feet 16 within slots 18 to the proper position which insures a snug fit inside top of sink 14, then tighten screws 20 to hold feet 16 in place.

Place sink cover/cutting board into sink and use for food preparation, or place sink cover/cutting board on counter, table or other support for use as a cutting board.

Leave sink cover/cutting board in place in sink when not in use to enhance attractiveness of kitchen and to provide additional counter space.

SUMMARY, RAMIFICATIONS AND SCOPE

Accordingly, the reader will see that the RV sink cover/cutting board of this invention provides a recreational vehicle owner with a versatile new solution to these inherent dilemmas encountered in RV kitchens:

(a) Concealment of an unsightly or cluttered sink, (b) Addition to an extremely limited amount of counter or work space, (c) Instant availability of a knifeproof, sanitary cutting surface, (d) Color to match the RV interior decor, and (e) Commercial availability in a size to fit the RV sink.

Therefore I claim:

1. A combination food preparation surface and sink cover for placement on the top surface of a sink comprising:

(a) a generally rectangular platform having four peripheral edges bounding planar top and bottom surfaces, said platform being composed of a material suitable for food preparation;

(b) a plurality of adjustable feet, said adjustable feet attached to said bottom surface and being adjustable toward and away from said edges;

(c) at least two of said edges being intersected by an arcuate cut which defines an arcuate opening in one corner of said board to serve as a handhold and a water stream passageway;

(d) said top planar surface having a groove therein extending from said arcuate opening along a path generally parallel to said edges and terminating at said arcuate opening in order to allow liquids to flow in said groove to be expelled toward said sink through said arcuate opening.

2. The combination as defined in claim 1 wherein said platform is composed of polyethylene.

3. The combination as defined in claim 1 wherein said platform is composed of a relatively dense material.

4. The combination as defined in claim 1 wherein said platform is composed of a colored material.

5. The combination as defined in claim 1 wherein said platform is positioned substantially flush with the top surface of said recreational vehicle sink.

6. The combination as defined in claim 1 wherein said feet are composed of a high-friction material.

7. The combination as defined in claim 1 wherein said bottom surface defines a plurality of foot adjustment slots.

8. The combination as defined in claim 1 wherein said feet each comprise a screw.

* * * * *